Feb. 18, 1930. H. L. JOHNSTON 1,747,443
MIXING MACHINE
Filed Nov. 30, 1928 2 Sheets-Sheet 2

INVENTOR
Herbert L. Johnston
BY Marechal and Noe
ATTORNEYS

Patented Feb. 18, 1930

1,747,443

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

MIXING MACHINE

Application filed November 30, 1928. Serial No. 322,859.

This invention relates to mixing machines and particularly to machines for mixing foodstuffs such as bread dough and the like.

The primary object of the invention is the provision of a mixing machine of this character adapted to be operated with a minimum of attention, and which may be easily controlled by the operator.

Other objects and advantages of the invention will be apparent from the following description when taken in connection with the accompanying drawings.

Figure 1:
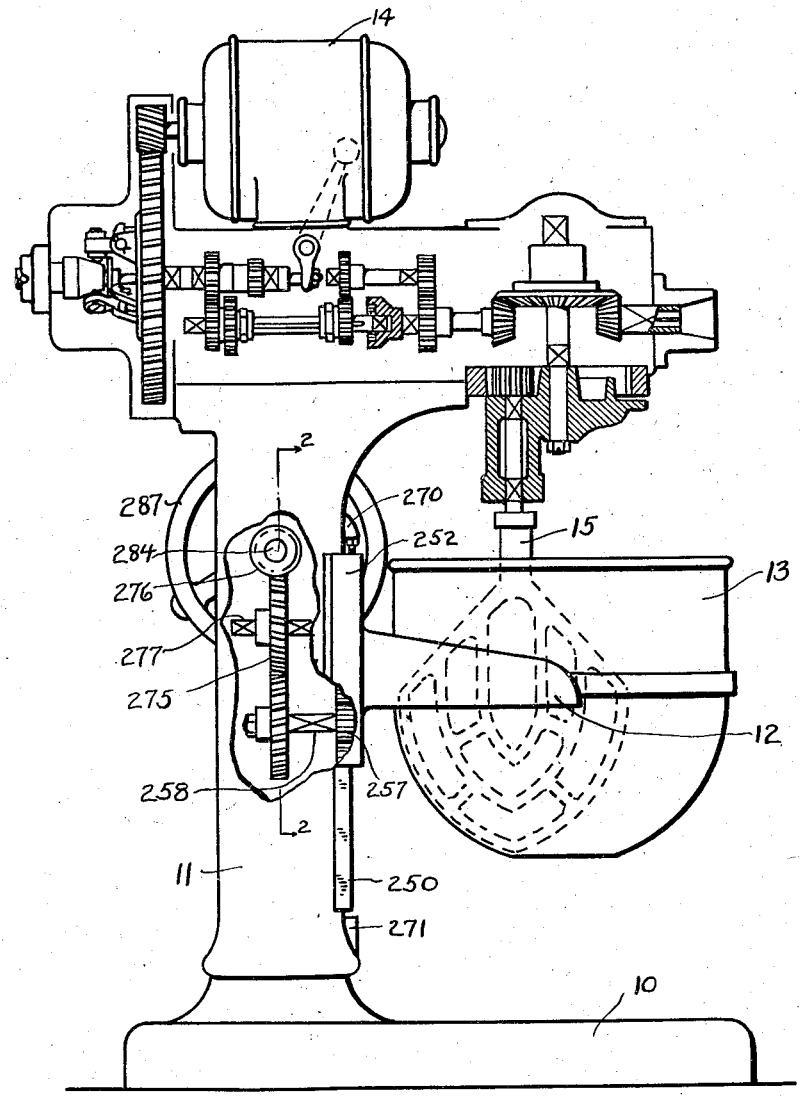
Figure 2:
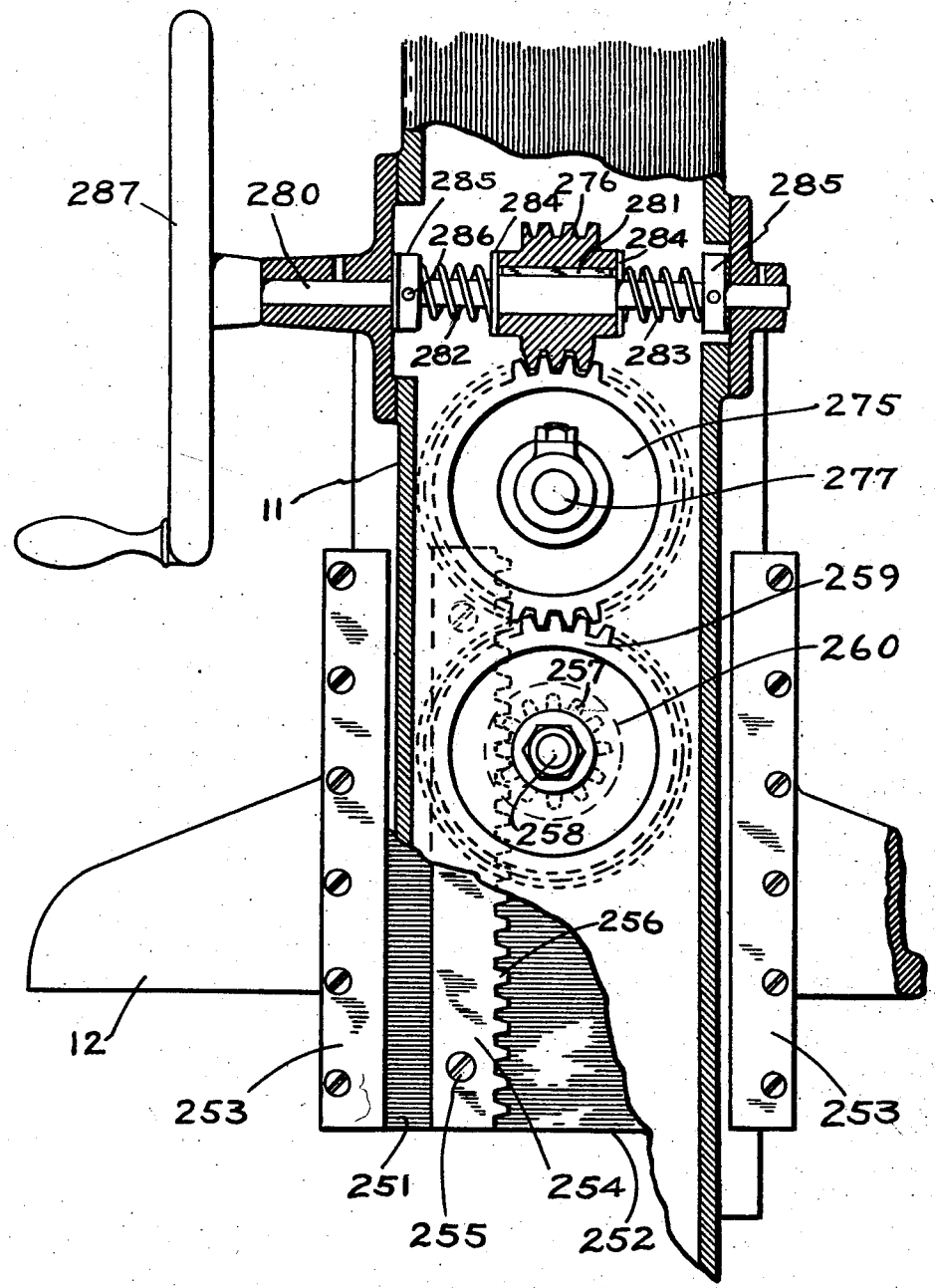

In the drawings, Fig. 1 is a side elevation of a mixing machine embodying the present invention, shown with parts broken away disclosing the driving mechanism; and Fig. 2 is a vertical section through the supporting pedestal on the line 2—2 of Fig. 2.

Referring more particularly to the drawings in which like characters of reference represent corresponding parts in the various figures, the machine is comprised essentially of a base 10 upon which is mounted a supporting pedestal 11 which holds the supporting table 12 in which is mounted the mixing bowl 13. At the upper part of the pedestal is the gear or transmission mechanism by means of which the electric motor 14 is connected to the revolving mixing arm 15. The mixing arm 15 is preferably so operated that it rotates about its own axis while moving bodily about in the mixing bowl. Suitable operating mechanism is provided by means of which the operator is permitted to control the starting and stopping of the machine and to control the speed of operation thereof. This case however is particularly concerned with the elevating mechanism for the mixing bowl, the present case being a division of my prior application for Letters Patent entitled Mixing machine, Serial No. 196,785, filed June 6, 1927.

The mixing arm 15 of the machine extends down so as to mix the foodstuffs contained within the bowl 13. The machine is particularly adapted to mix foodstuffs such as cake dough, bread dough and other similar materials, although it obviously can be used for mixing any desired material for any other purpose. The bowl 13 is held or supported by the table 12 which is adapted to be vertically adjusted so as to raise or lower the bowl to permit its removal or to adjust the extent to which the mixing arm 15 extends into the bowl.

The pedestal 11 is provided with a front flat bearing surface 250 against which bears the rear flat bearing surface 251 of the supporting rack post 252. The rack post has side portions 253 which extend around the sides of the bearing surface 250 of the pedestal. The upper portion of the rack post forms a close engagement throughout its transverse extent with the front surface 250 so that food particles or other materials being mixed will not be permitted to get between the rack post 252 and the bearing surface 250. The rack post carries a vertical rack 254 which is attached by means of the screws 255 and which is provided with inwardly projecting teeth 256 adapted to engage with the teeth of a pinion 257 mounted on a shaft 258 extending through the pedestal and bearing a gear 259 in the interior of the hollow pedestal 11. The shaft 258 is mounted in suitable bearings in the pedestal and the pinion 257 is located in an open space 260 in the bearing surface 250 of the pedestal. The pedestal bearing surface 250 is therefore enclosed on the top and sides by the rack post 252 so that in case of splashing of the material being operated upon in the bowl there would be no tendency for these splashes to find their way into the inside of the pedestal and to cause a foul or unsanitary condition to exist.

The upward and downward movement of the rack post 252 is limited at its upper and lower limits of movement by the limiting stops or lugs 270 and 271 provided at the upper and lower portions of the pedestal in the path of movement of the upper and lower portions of the rack post 252. The vertical movement of the rack post and the bowl-supporting table is accomplished by rotation of the pinion 257 which is operated by the gear 259 meshing with the idler gear 275 which serves as a worm-wheel and is adapted to be operated by means of the worm 276 above it. The idler gear 275 is mounted upon a shaft 277 fixed on the pedestal in any suitable manner and the worm 276 which engages this idler gear causes the rotation of the gear train to elevate or depress the bowl. The worm 276 is keyed on the control shaft 280 by means of the key 281 but is otherwise free to move longitudinally along the shaft except as restrained by the two springs 282 and 283 each of which engages at one side with a collar 284 mounted freely on the shaft 280 in contact with a shoulder on the gear and at its other end with the fixed collar 285 which is fixed to the shaft 280 by means of a pin 286. The springs 282 and 283 thus maintain the worm 276 in a normal central position on the shaft 280 and these springs are sufficiently strong so that the worm 276 is maintained in a substantially central position between the sides of the pillar and in engagement with the idler gear 275 as the control shaft 280 is manipulated in a normal manner by means of the manually operable hand-wheel 287. This hand-wheel is located on the side of the machine where it can be easily adjusted by the operator for the purpose of rotating the gear train to elevate and depress the bowl.

Although the springs 282 and 283 which center the worm 276 and normally maintain it in engagement with the idler gear 275 are sufficiently strong to prevent excessive endwise movement of the worm 276 during the normal raising or lowering of the bowl, they are adapted to yield when the bowl has been raised to its upper or lowered to its lowermost level and abuts against the stops 270 or 271. In case the operator continues to apply force to the control wheel 287 after the rack post 252 has come into engagement with one or the other of the limiting stops the springs 282 and 283 will permit the operator to continue to rotate the hand-wheel 287 against ever increasing pressure of these springs without jamming the gear train and without further jamming the supporting rack post against the limiting stops. The increasing resistance on the hand-wheel by reason of the compression of one of the springs 282 and 283 will immediately notify the operator that he should stop the rotation of the hand-wheel. However, if he continues to rotate the hand-wheel the worm 276 will merely move endwise along the shaft 280 without causing any rotation of the gear train with which it is engaged.

It will now be apparent that the raising and lowering movements of the bowl may be readily effected. Operation of the hand-wheel 287 in one direction causes the bowl to be raised to cooperative association with the mixing arm 15. After the material has been beaten or mixed, the hand-wheel 287 is again operated but in the reverse direction to cause the lowering of the bowl so that it may be readily removed from the table 12.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a mixing device of the class described, an elevating mechanism comprising a pedestal, a slide face on said pedestal, a slide adjustable along said face, a rack on said slide and a pinion for operating said rack enclosed by said slide.

2. In a mixing bowl of the class described, an elevating mechanism comprising a pedestal, a slide face on said pedestal, a slide adjustable along said face, a rack on said slide and a pinion rotatably mounted on said pedestal and lying flatwise relatively to the slide and in engagement with said rack.

3. In a device of the class described, a pedestal, a support vertically movable along said pedestal, inwardly-extending rack teeth on the inner side of said support, a pinion on the outer side of said pedestal engaging said rack teeth, and a shaft for said pinion extending into said pedestal, and means for operating said shaft.

4. In a device of the class described, a pedestal, a support vertically movable along said pedestal, inwardly-extending rack teeth on the inner side of said support, a pinion on the outer side of said pedestal engaging said rack teeth, and a shaft for said pinion extending into said pedestal, means for operating said shaft, and resilient means for preventing jamming of said means.

5. In a device of the class described, a pedestal, a bowl support vertically movable along said pedestal, operating means for said bowl support whereby it may be moved in opposite directions along said pedestal, said operating means including resilient means preventing jamming of the operating means.

6. In a device of the class described, a pedestal, a bowl support vertically slidable along said pedestal, operating mechanism for sliding said bowl support up and down on said pedestal, self-locking operating means for operating said mechanism and adapted for manual operation, and resilient means preventing jamming of said operating means.

7. In a device of the class described, a pedestal, a support vertically movable along said pedestal, and means for moving said support comprising a hand-operated shaft, a worm operated by said shaft mounted capable of endwise movement, and spring means normally holding said worm in normal position.

8. In a device of the class described, a pedestal, a support vertically movable along said pedestal and means for moving said support comprising a manually controlled shaft, a worm-wheel, a worm engaging said worm-wheel and rotated by said shaft, said worm being capable of endwise movement, spring means normally holding said worm in operating position in engagement with said worm-wheel, said spring means maintaining said worm and worm-wheel engaged for normal operation but permitting rotational movements of the worm without corresponding rotational movements of the worm-wheel.

9. In a mixing device of the class described, a pedestal, a slide face on said pedestal, a bowl supporting slide adjustable along said slide face, and operating means for raising and lowering the slide said means being enclosed and protected by said slide in various positions of the slide on the slide face.

In testimony whereof I hereto affix my signature.

HERBERT L. JOHNSTON.